United States Patent
Peirce

(10) Patent No.: US 9,276,737 B2
(45) Date of Patent: Mar. 1, 2016

(54) SECURING A COMMAND PATH BETWEEN A VEHICLE AND PERSONAL WIRELESS DEVICE

(71) Applicant: General Motors LLC, Detroit, MI (US)

(72) Inventor: Kenneth L. Peirce, Grosse Pointe Farms, MI (US)

(73) Assignee: General Motors LLC, Detroit, MI (US)

( * ) Notice: Subject to any disclaimer, the term of this patent is extended or adjusted under 35 U.S.C. 154(b) by 187 days.

(21) Appl. No.: 13/804,533

(22) Filed: Mar. 14, 2013

(65) Prior Publication Data

US 2014/0270172 A1 Sep. 18, 2014

(51) Int. Cl.
*H04L 29/06* (2006.01)
*H04L 9/08* (2006.01)
*H04W 12/04* (2009.01)
*H04L 9/32* (2006.01)
*H04W 12/06* (2009.01)
*H04L 29/08* (2006.01)
*G07C 5/00* (2006.01)

(52) U.S. Cl.
CPC .............. *H04L 9/0819* (2013.01); *H04L 9/083* (2013.01); *H04L 9/0822* (2013.01); *H04L 9/0825* (2013.01); *H04L 9/3297* (2013.01); *H04L 63/08* (2013.01); *H04W 12/04* (2013.01); *G07C 5/008* (2013.01); *H04L 63/062* (2013.01); *H04L 63/0823* (2013.01); *H04L 63/0853* (2013.01); *H04L 67/12* (2013.01); *H04L 2209/80* (2013.01); *H04L 2209/84* (2013.01); *H04W 12/06* (2013.01)

(58) Field of Classification Search
CPC .... H04L 9/0819; H04L 63/08; H04L 2209/84
USPC ....................................................... 380/277
See application file for complete search history.

(56) References Cited

U.S. PATENT DOCUMENTS

| | | | | |
|---|---|---|---|---|
| 5,673,316 A * | 9/1997 | Auerbach et al. | ................ | 705/51 |
| 6,233,341 B1 * | 5/2001 | Riggins | .......................... | 380/277 |
| 6,834,112 B1 * | 12/2004 | Brickell | ........................ | 380/279 |
| 8,908,870 B2 * | 12/2014 | Cizas | ...................... | G06F 21/76 380/284 |
| 2005/0172154 A1 * | 8/2005 | Short | ...................... | H04H 60/23 726/5 |
| 2007/0106892 A1 * | 5/2007 | Engberg | ........................ | 713/168 |
| 2007/0136360 A1 * | 6/2007 | Randall | ................. | H04M 1/576 |
| 2007/0258595 A1 * | 11/2007 | Choy | .............................. | 380/278 |
| 2007/0271459 A1 * | 11/2007 | Gomez | ........................... | 713/171 |
| 2009/0119657 A1 * | 5/2009 | Link, II | ..................... | G06F 8/65 717/171 |
| 2009/0249074 A1 * | 10/2009 | Madhavan et al. | ............. | 713/176 |
| 2010/0013304 A1 * | 1/2010 | Heineman | ........................ | 307/31 |

(Continued)

*Primary Examiner* — Izunna Okeke
*Assistant Examiner* — Bryan Wright
(74) *Attorney, Agent, or Firm* — Christopher DeVries; Reising Ethington P.C.

(57) ABSTRACT

A system and a method using that system is provided for establishing a secure communication channel between a vehicle and a mobile device. The method may include providing at least one unique mobile device identifier and at least one unique vehicle telematics unit identifier associated with the mobile device identifier to a call center. At least one of the two identifiers may be provided to a wireless service provider. Two private keys may be generated—a first private key based on the at least one unique mobile identifier and a second private key based on the at least one unique vehicle telematics unit identifier. The first private key may be provided to the mobile device within a first cryptographic envelope signed with a first cryptographic key. And the second private key may be provided to the vehicle telematics unit within a second cryptographic envelope signed with a second cryptographic key.

20 Claims, 7 Drawing Sheets

(56) References Cited

U.S. PATENT DOCUMENTS

| | | | |
|---|---|---|---|
| 2010/0161491 A1* | 6/2010 | Bauchot et al. | 705/50 |
| 2011/0055546 A1* | 3/2011 | Klassen | G06F 21/305 713/150 |
| 2011/0294466 A1* | 12/2011 | Tang et al. | 455/411 |
| 2013/0169410 A1* | 7/2013 | Amselem | G05B 1/01 340/5.52 |
| 2014/0006347 A1* | 1/2014 | Qureshi et al. | 707/621 |
| 2014/0079217 A1* | 3/2014 | Bai | H04L 63/0869 380/270 |
| 2014/0162601 A1* | 6/2014 | Kim et al. | 455/411 |

* cited by examiner

SECURING A COMMAND PATH BETWEEN A VEHICLE AND PERSONAL WIRELESS DEVICE

TECHNICAL FIELD

The present invention relates to secure communications between a mobile device and a vehicle, more specifically, the invention relates to using cryptographic communications between a mobile device and a telematics unit in order to perform a vehicle function.

BACKGROUND

Transport Layer Security (TLS) is a known technology used in digital networks to establish and carry out secure communication between two entities. The communicating entities can be devices such as computers or other electronic apparatuses capable of digital communication, and the two entities may be communicating as peers or in a client/server configuration. TLS is implemented using digital certificates which, through public key cryptography (i.e., using public key infrastructure, PKI) and a common trusted entity, enable one or both of the communicating entities to authenticate the other and enable the two entities to exchange information confidentially. Secure Socket Layers (SSL) is an earlier form or predecessor of TLS that has been widely used over the Internet.

TLS is commonly used in TCP/IP networks using X.509 digital certificates which are typically issued by a trusted third party certificate authority (CA) and signed with the CA's private key. The holder (subject) of the certificate can then use it to authenticate itself to other entities. The associated CA public key is distributed to those entities as a part of a self-signed certificate. Authentication of a received digital certificate then involves using the CA's public key to decrypt the digital signature and compare the result to the contents actually contained in the certificate. More specifically, when the certificate is originally signed, a hash is performed of the certificate's contents and the result is encrypted using the CA's private key. This encrypted result is used as the digital signature and is appended to the certificate. Then, to authenticate, a recipient of the certificate uses the public key to decrypt the hash, and then compares this decrypted hash result with its own hash of the received certificate data items that it takes using the same hash function. If the two results match, then this indicates that the contents of the certificate are authentic. That authenticated content includes the certificate holder's (subject's) identity and public key so that the recipient of the certificate can now know that the identity is authentic and can communicate confidentially with the subject using its public key.

SUMMARY

According to an embodiment of the invention, there is provided a method of establishing a secure communication channel between a vehicle and a mobile device. The method may include providing at least one unique mobile device identifier and at least one unique vehicle telematics unit (VTU) identifier associated with the mobile device identifier to a call center. It may include generating at least one private key associated at least in part with the at least one unique mobile device identifier and at least in part with the at least one unique VTU identifier. It may further include providing the at least one private key to the mobile device within a first cryptographic envelope signed with a first cryptographic key. And it may include providing the at least one private key to the VTU within a second cryptographic envelope signed with a second cryptographic key, wherein the second cryptographic envelope is different than the first cryptographic envelope.

According to another embodiment of the invention, there is provided a method of receiving a secure communication at a vehicle from a mobile device. The method may include establishing short range wireless communication (SRWC) between a mobile device and a vehicle telematics unit (VTU). It may further include receiving at the VTU at least one communication from the mobile device; the at least one communication may be digitally signed using a first private key, and the first private key may be associated at least in part with a unique identifier associated with a first subscriber identity module (SIM) within the mobile device. The at least one communication may include a first public key associated with the first private key. The method may also include decrypting the at least one communication at the VTU using the first public key; the first private key may have been received by the mobile device previous to the receiving step in a first cryptographic envelope signed with a first cryptographic key from a wireless service provider (WSP).

According to another embodiment of the invention, there is provided a method of secure communication. The method may include receiving at a mobile device a first private key in an encrypted envelope from a wireless service provider (WSP); the mobile device may have a subscriber identity module (SIM) having a computer processing unit (CPU). It may further include receiving at a vehicle telematics unit (VTU) a second private key in an encrypted envelope from one of a call center or the WSP; the mobile device may have a subscriber identity module (SIM) having a computer processing unit (CPU), and the first and second private keys may be associated with a first identifier in the mobile device and a second identifier in the VTU. Further, the method may include establishing short range wireless communication (SRWC) between the mobile device and the VTU. The method may include receiving at the VTU a first communication via SRWC from the mobile device digitally signed using the first private key, and the digital signature of the mobile device may be associated with the first private key and random data accessible to mobile device's SIM CPU. And the method may further include after decrypting the first communication, responding to the mobile device with a second communication via SRWC digitally signed using the second private key; the digital signature of the VTU may be associated with the second private key and random data accessible to VTU's SIM CPU.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The system and method described below pertains to securing communications between a vehicle and a mobile device. The user of the vehicle and the mobile device may desire from time to time to perform various vehicle functions using the mobile device, such as starting the vehicle engine and unlocking the vehicle doors. Performance of these and other vehicle functions using a mobile device are subject to malicious attacks by computer and/or network hackers. The method and system pertain to alleviating these attacks.

Communications System—

Figure 1:
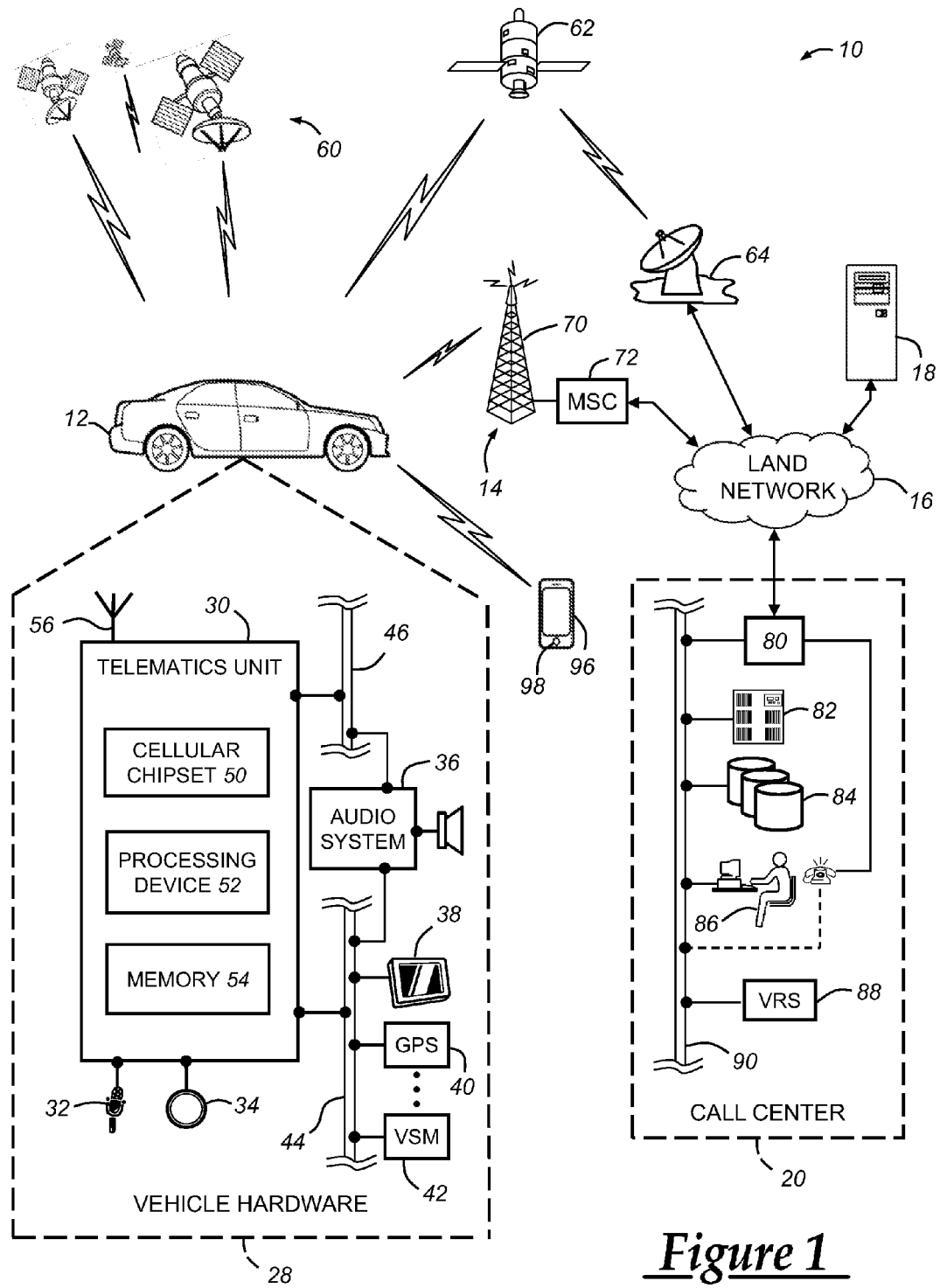
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

The telematics unit 30 may include a subscriber identity module (SIM). As will be appreciated by skilled artisans, the SIM may include its own computer processing unit (CPU) and memory (e.g., RAM, flash, etc.). In at least one implementation, the SIM CPU may hold or carry or store confidential information; e.g., the SIM CPU may store information or data that is marked confidential (so that only the SIM CPU can access it) or it may have a portion or region therein which only the CPU can access in which the confidential information is stored. In addition, the SIM may be an integrated circuit and in some instances, the SIM may be detachably coupled to the telematics unit (e.g., a SIM card). The SIM may be capable of running its own software (e.g., applications, Java applets, etc.). In addition, one or more unique identifiers may be associated with the SIM and stored thereon—e.g., the SIM may have an international mobile subscriber identity (IMSI) and/or a unique serial number (e.g., an integrated circuit card identifier or ICCID). Both IMSIs and ICCIDs are known—e.g., IMSIs may include a series of digits (e.g., in some instances 14 to 15 digits). As also will be appreciated by skilled artisans, the SIM may also store additional information (e.g., security information, authentication information, network information, device services information, etc.).

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. In addition, the one or more wireless service providers (WSPs) may utilize the carrier system 14; as used herein, the term wireless service provider includes any entity using the carrier system 14 to provide wireless or other cellular service to customers, clients, etc.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. Such mobile device applications may include software applications, which may be preinstalled or installed by the user (or manufacturer) (e.g., having a graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The hardware of the mobile device 96 may have electronics known to skilled artisans including a communication interface(s), an antenna, etc. In addition, the mobile device 96 may also include a subscriber identity module (e.g., SIM-1) having one or more unique identifiers unique to the device 96 (e.g., such as its IMSI, ICCID, etc.). The SIM-1 may operate one or more of the software applications, as will be described in greater detail below. Subscriber identity modules in mobile devices are known and in at least some instances may be similar to subscriber identity modules in telematics units; therefore, SIM-1 in the mobile device will not be re-described here.

The hardware of the mobile device 96 may further include: a display, a keypad (e.g., push button and/or touch screen), a microphone, one or more speakers, motion-detection sensors (such as accelerometers, gyroscopes, etc.), a camera, and one or more soft and/or hard switches 98 (e.g., soft switches may include touch switches implemented using software, and hard switches may include tactile switches). In addition to the aforementioned features, modern mobile devices may support additional services and/or functionality such as short messaging service (SMS or texts), multimedia messaging service (MMS), email, internet access, as well as business and gaming applications. Non-limiting examples of the mobile device 96 include a cellular telephone, a personal digital assistant (PDA), a Smart Phone, a personal laptop computer having two-way communication capabilities, a netbook computer, or any suitable combinations thereof. The mobile device 96 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as the driver. However, the vehicle user does not need to be the driver of the vehicle 12 nor does the vehicle user need to have ownership of the mobile device 96 or the vehicle 12 (e.g., the vehicle user may be an owner or a licensee of either or both).

Method—

Figure 2:
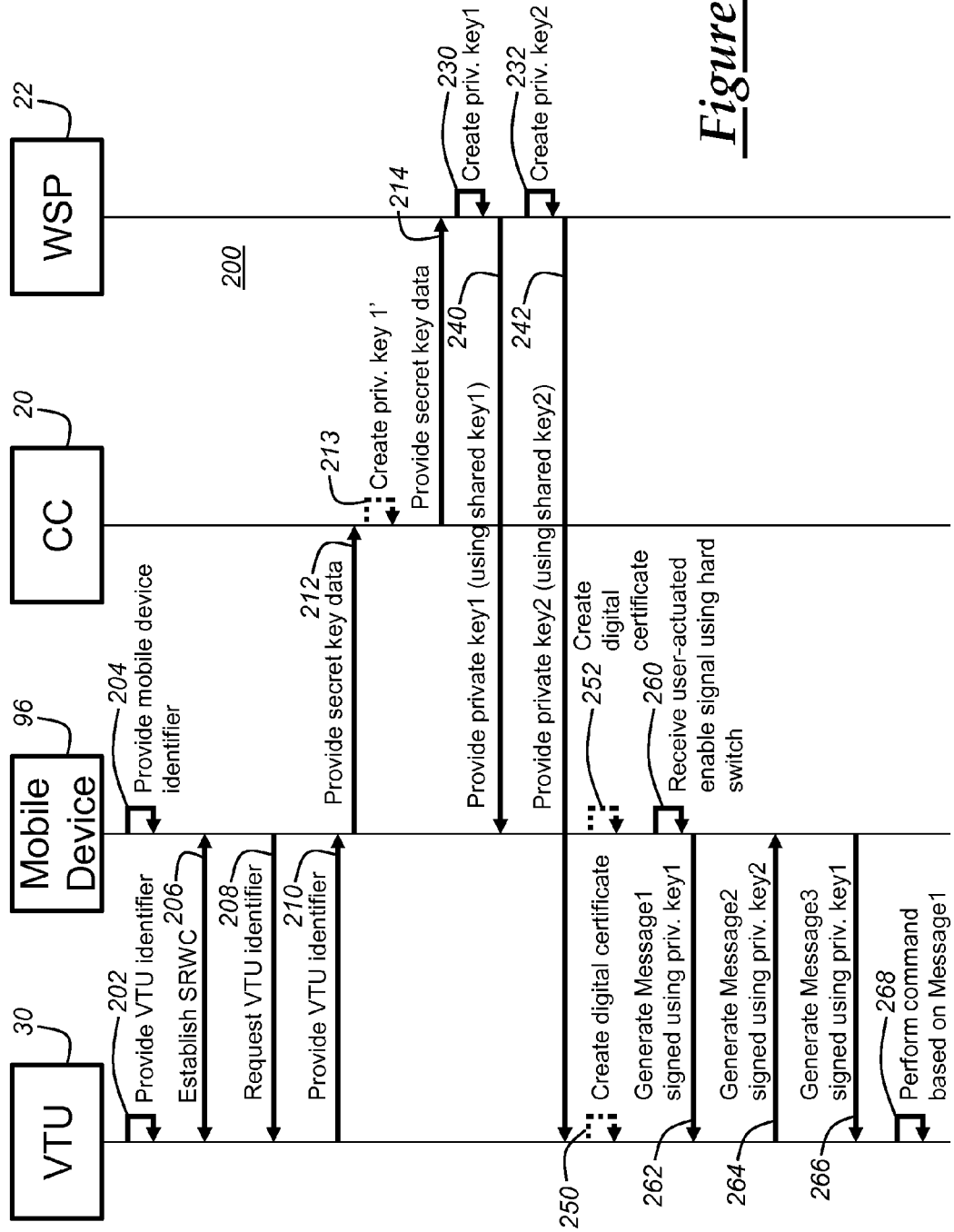
FIG. 2 is a flow diagram depicting an exemplary embodiment of the system and method.

Turning now to FIG. 2, there is shown one embodiment of a system and a method 200 for establishing a secure communication between the vehicle telematics unit 30 and the mobile device 96. The system includes the following elements: the vehicle telematics unit (VTU) 30, the mobile device 96, the call center (CC) 20, and a wireless service provider (WSP) 22. The method includes interaction and/or communications between the system elements. FIG. 2 also illustrates a method of sending a secure communication between various system elements: between the telematics unit 30 and the mobile device 96; between the WSP 22 and the mobile device 96; and between the WSP 22 and the telematics unit 30. In one implementation, the secure communication between the telematics unit 30 and the mobile device 96 includes a command to perform a vehicle function (e.g., unlocking of vehicle door or starting a vehicle's engine).

The method begins at step 202 where the telematics unit 30 is provided with a SIM, and the SIM may include an IMSI. Similarly, at step 204 the mobile device may be provided with a subscriber identity module (SIM-1) 130 having its own IMSI. The providing or installation of the SIM-1 and SIM of the telematics unit 30 may occur at the time of manufacture or an aftermarket sale or at any other suitable time; and the SIMs may be provided by an authorized representative (e.g., a manufacturer or service representative) or by a retailer or other suitable personnel.

The telematics unit 30 and mobile device 96 may establish communication using any form of short range wireless communication (SRWC) [step 206]; e.g., where the SRWC is Bluetooth, they may be paired and/or bonded with one another. SRWC technology is known—as is pairing, bonding, or other client/server protocols. In some embodiments it may be desirable to have greater security than is available in standard SRWC protocols; here, the mobile device 96 may request one or more special or unique identifiers from the telematics unit so that the unique identifier(s) may ultimately be used as the basis of a privately encrypted key or so that the privately encrypted key may be associated with the identifiers [step 208]. The unique identifier(s) of the telematics unit may include any unique combination of numerals, letters, or other various characters. Examples of the unique identifier include the vehicle identification number (VIN) and the IMSI-2, however other identifiers are also possible. At step 210, the telematics unit may provide the unique identifier(s) to the mobile device 96. This providing step may be predicated on a previously established trust relationship between the telematics unit 30 and mobile device (e.g., the telematics unit 30 may be able to classify or identify that the user of the mobile device is also the vehicle user). Next, at step 212, the mobile device may send to the call center 20 information or data associated with generating a secret key (or simply secret key information or data). This may include any information associated with using, creating, identifying, etc. a secret key. For example, in FIG. 2, the secret key data may be the telematics unit identifier(s) together with one or more unique identifier(s) associated with the mobile device. The nature of the mobile device's unique identifier(s) may be similar to that of the telematics unit (i.e., they may include any unique combination of numerals, letters, or other various characters associated with the mobile device; e.g., they may include a mobile identity number (MIN) or the IMSI-1. Thereafter, the call center 20 may authenticate (or further authenticate) or determine whether the mobile device 96 is associated with the telematics unit 30—e.g., whether the owner and/or licensee of the telematics unit (or vehicle) and the mobile device is the same or at least that the particular mobile device 96 is previously associated with the owner and/or licensee of the telematics unit. Then at step 214, provided the telematics unit is associated with the mobile device, the call center may provide the secret key data associated with the telematics unit and the mobile device to the WSP 22 which may serve as a certificate authority. In some instances, the WSP 22 may authenticate or determine an association between the mobile device and the telematics unit.

Once the secret key data has been provided to the WSP 22, in one embodiment the WSP may then create or generate two private-public key pairs according to a public key infrastructure—a first private-public key pair for the mobile device and a second private-public key pair for the telematics unit. For example, at step 230, the WSP may create the first key pair associated with the IMSI-1 (and/or any other unique mobile device identifier that was provided), and at step 232, the WSP may create a second key pair associated with the IMSI-2 (and/or any other unique telematics unit identifier that was provided). Various encryption schemes may be used as will be appreciated by skilled artisans.

At step 240, a first private key and a first public key (the first key pair of cryptographic keys) may be transmitted or sent to the mobile device 96 from the WSP 22 within a first cryptographic envelope. And at step 242, a second private key and a second public key (the second key pair of cryptographic keys) may be transmitted or sent to the telematics unit 30 from the WSP 22 within a second cryptographic envelope. As will be appreciated by skilled artisans, the identity and/or characteristics of the private key in any key pair must be kept secret in order for communications signed therewith to be authentic or secret. Therefore, to maintain the secrecy of the first private key, the WSP may include the first private key within the first cryptographic envelope by signing the communication 240 using a shared key according to a private key infrastructure—i.e., the WSP 22 and the mobile device 96 may have a shared key or a symmetric key. As will be appreciated by skilled artisans, in private key infrastructure, only the holders or keepers of the shared key are able to read and/or understand the communication signed therewith (as opposed to public key infrastructure—where a communication signed with a private key enables any holder of the associated public key to read and/or understand the communication following decryption). To similarly maintain the secrecy of the second private key, the transmission 242 of the second private key may be included within the second cryptographic envelope being signed using a different shared key—i.e., a private key that is shared by or between the WSP 22 and the telematics unit 30 according to private key infrastructure. In some instances, one shared, common key may be held by the WSP 22, the telematics unit 30, and the mobile device 96.

FIG. 2 also illustrates alternative implementation. After the call center 20 receives the secret key data [step 212], the call center 20 may create a private key 1' associated with all or a portion of the secret key data [optional step 213]. For example, the call center may combine the two identifiers (from the telematics unit 30 and the mobile device 96) and generate the private key 1' or none of the identifier information may be used as the basis for the private key (but it may be used only to associate the private key with the vehicle and mobile device). Then, in step 214 secret key data is again provided to the WSP 22. Here the secret key data may include the secret key itself. Thereafter, the WSP does not create any additional keys (i.e., omitting steps 230, 232), but instead provides the private key 1' to the mobile device using shared key1 [step 240] and to the telematics unit 30 using shared key2 [step 242]. Thus, in this implementation the first and second private keys may be the same private key 1'.

Once the mobile device 96 has the first private key, the mobile device may have a secure communication channel to send one or more secure communications to the telematics unit—including a secure communication to perform a vehicle function such as unlocking the vehicle doors. And once the telematics unit 30 has the second private key, the telematics unit may have a secure channel to send one or more communications to the mobile device. And in some implementations, the private key (i.e., the first private key, the second private key, the private key 1', etc.) may be held, carried, or stored as confidential information, accessible only to the CPU of the SIM in the telematics unit 30.

Figure 6:
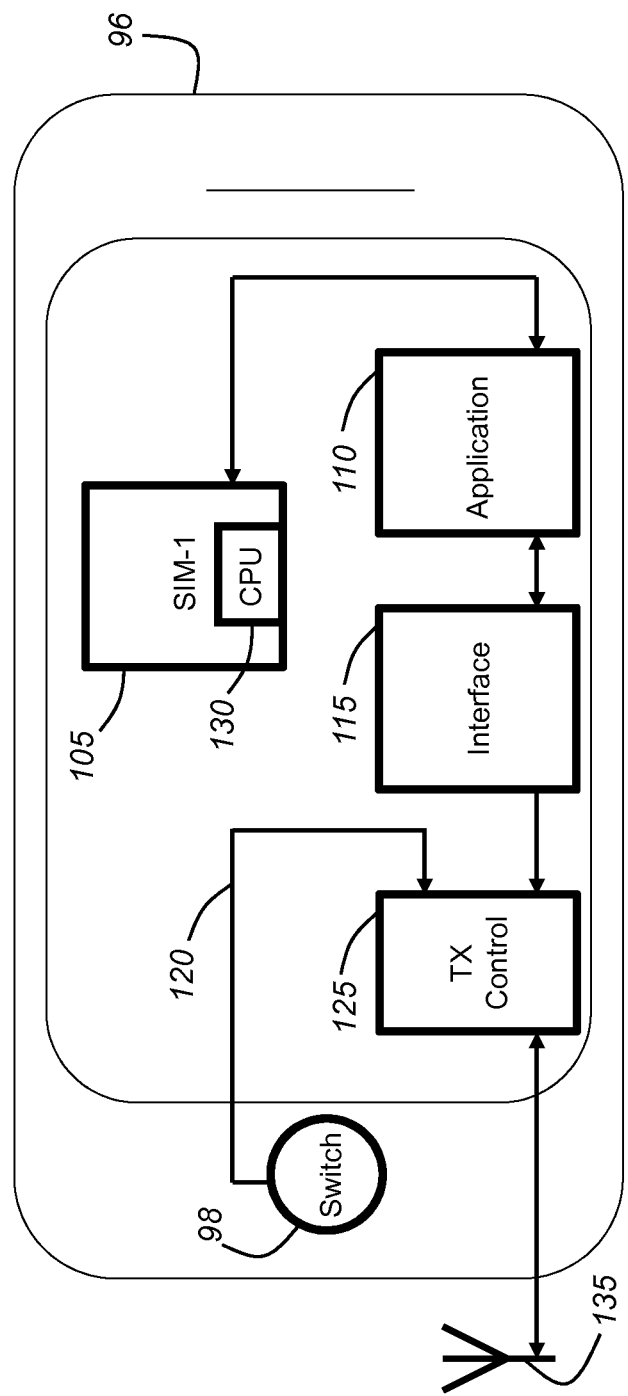
FIG. 6 is a diagram illustrating one embodiment of a mobile device.
Figure 7:
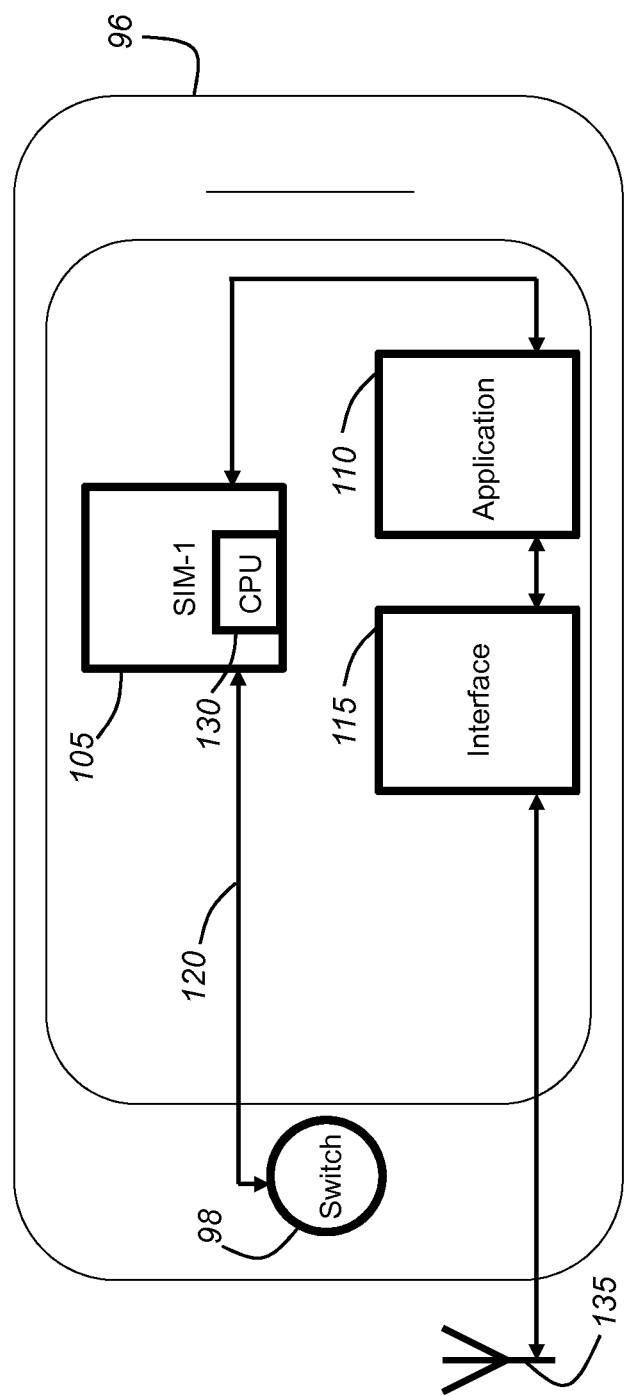
FIG. 7 is a diagram illustrating another embodiment of the mobile device.

In one implementation in order to perform the vehicle function, the mobile device 96 may determine or detect user-based input which may include a command (e.g., using a software application on the mobile device) and/or the enablement or actuation of the hard switch 98 on the device 96 [step 260]. The actuation or enablement may act as a safeguard against malicious attacks such piggybacking and/or other attacks known to skilled artisans. For example, the mobile device may not transmit the vehicle function command without the user depressing the switch 98 at the time the command is sent to the telematics unit. FIGS. 6 and 7 illustrate two implementations; however, other implementations are also possible. In FIG. 6, the mobile device 96 may include the SIM-1 (105) having a CPU 130 in communication with a user interface 115 via a software application 110 (such as RemoteLink™). The switch 98 may be coupled to a transmit controller 125 via a line 120 (e.g., the ENABLE line). The interface 115 also may be coupled to the controller 125; and the controller 125 may be coupled to an antenna 135. In at least one implementation, the switch 98 may be a momentary switch. When depressed, the controller 125 may allow transmission of the vehicle command when the user is interacting with the interface 115; thus, the command may be transmitted only when the mobile device is within the user's hand and may thus serve as a countermeasure against piggybacking.

Another implementation shown in FIG. 7 includes the same elements as FIG. 6 (excluding the transmit controller 125). However here, the switch 98 may be coupled to the SIM-1 105 (via ENABLE line 120); the SIM-1 may be in communication with the interface 115 via the application 110; and the interface 115 may be coupled to the antenna 135. In operation, when the switch is depressed (e.g., line 120 becomes enabled or ON), the SIM-1 may be enabled (to an operative state) allowing transmission of the vehicle command when the user is interacting with the interface 115

Now returning to FIG. 2, in at least one exemplary implementation, upon receiving the user-based input, the mobile device may generate a first secure communication or message requesting the telematics unit 30 to perform a vehicle function—e.g., such as unlocking a vehicle door [step 262]. The first message may be time stamped (timestamp-1) and signed by the mobile device using the first private key; furthermore, the first message may include a first digital certificate associated with the first private key. As will be appreciated by skilled artisans, the digital certificate may include the first public key as well as various other known certificate data (e.g., version, serial number, issuer, the issuer's digital signature, etc.).

After the telematics unit 30 receives the first message, the telematics unit may generate a challenge or second message that includes a challenge or a query to further safeguard against malicious attacks [step 264]. In one implementation, the query is a nonce challenge. The challenge message may be time stamped (timestamp-2) and signed by the telematics unit using the second private key. In addition, it may also include a second digital certificate (e.g., which includes among other things the second public key).

When the mobile device 96 receives the challenge message, it may transmit a response or third message [step 266]. The response message may include the answer and/or response to the nonce challenge and may be signed using the first private key. In some instances, it may include the first digital certificate and also may be time stamped (timestamp-3).

Finally, the telematics unit may receive the response message from the mobile device. If the telematics unit is able to validate the response in the third message, the telematics unit may initiate performing the vehicle function—e.g., unlocking the vehicle door. Validation of the third message may include determining that the response to the nonce challenge within the third message is accurate, and that the first, second, and third time stamps occur within a predetermined amount of time. For example, if the amount of time between timestamp-2 and timestamp-1 is less than or equal to a first predetermined value, the message may be considered authentic. Similarly, if the amount of time between timestamp-3 and timestamp-2 is less than or equal to a second predetermined value, the message may be considered authentic. Or if the amount of time between timestamp-3 and timestamp-1 is less than or equal to a third predetermined value, the message may be considered authentic.

FIG. 2 illustrates another implementation associated with the messaging steps 262-268. Prior to completing these steps but after the telematics unit 30 receives the second private key [step 242], the telematics unit optionally may perform step 250 creating a digital certificate using the second private key plus at least one secondary identifier or random data accessible to the SIM CPU of the telematics unit. Random data may include random messaging values, timestamps, and the vehicle identification number (VIN), just to name a few examples. Thus in one embodiment, the SIM CPU of the telematics unit may access the second private key (stored or marked confidential), combine this with random data (e.g., the VIN), and use the second private key and the VIN to digitally sign its transmissions to the mobile device 96. Storing the private in a CPU-only accessible location and using the random data in addition to the second private key may be different than other systems and provide additional security in wireless transmission which may be particularly be important when performing functions commanded by the mobile phone 96 such as unlocking a vehicle door. This system and method may significantly increase the difficulty for hackers or attackers to decipher numerous or repeated transmissions between a particular mobile device 96 and its associated telematics unit 30 (e.g., repeated commands over time to unlock the vehicle).

FIG. 2 also illustrates optional step 252 where the mobile phone performs procedures similar to those just explained. For example, in step 252, the mobile phone creates a digital certificate using the first private key plus at least one secondary identifier or random data accessible to the SIM CPU 130 of the mobile phone 96 and uses this digital certificate in its communications with the telematics unit 30. The random data available to the mobile phone may include messaging values, timestamps, and a serial number of the phone, just to name a few examples. As will be explained below, optional steps 250 and 252 may be used in any of the other implementations (e.g., those shown in FIGS. 3-5).

Figure 3:
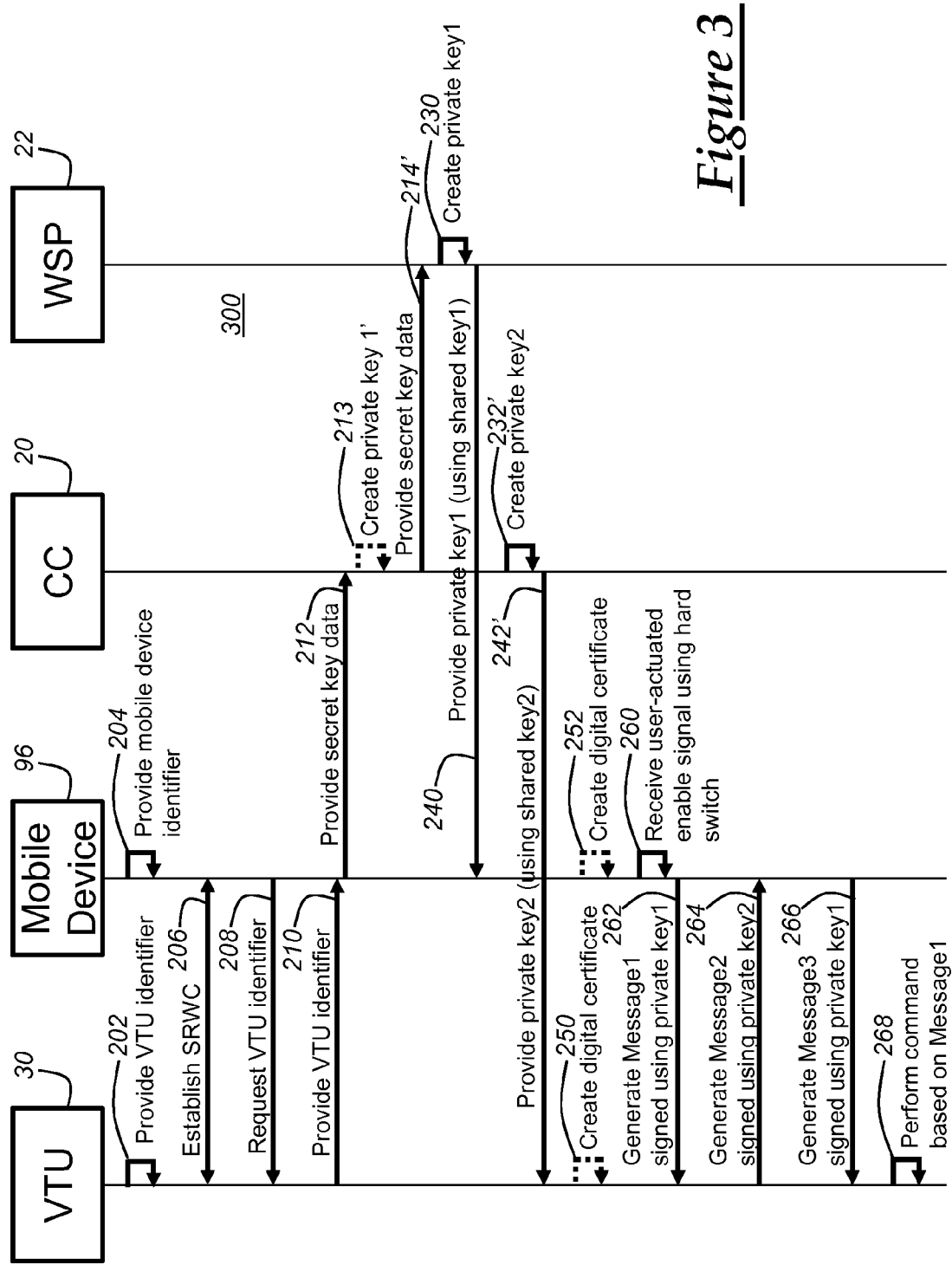
FIG. 3 is a flow diagram depicting another exemplary embodiment.

Turning now to FIG. 3, another embodiment (method 300) is shown that is substantially similar to the implementation shown in FIG. 2. In FIG. 3, steps 214, 232, and 242 may differ and are designated as 214', 232', and 242'—otherwise, all other steps are identical to those shown in FIG. 2 and therefore will not re-discussed here. In this embodiment, step 214' may differ; e.g., the secret key data may include only the one or more mobile device unique identifiers are sent from the call center 20 to the WSP 22. The vehicle telematics unit unique identifier(s) may not submitted to the WSP, because the call center 20 acts as the certificate authority instead of the WSP, and the call center generates the second private key (based on telematics unit identifier(s)) which may be previously known to the call center [step 232']. Thus, in step 242', it is the call center that transmits or communicates the second private key to the vehicle telematics unit 30. This communication may still be signed using a shared private key; however, here the private key infrastructure is between the call center 20 and the telematics unit 30.

It should be appreciated that other means exist of providing the identifiers of the mobile device 96 and the telematics unit 30 to the call center 20 and are contemplated herein.

Of course, where optional step 213 is implemented in the embodiment of FIG. 3, the step 214' may be identical to step 214 of FIG. 2 (i.e., the secret key data may still be the private key 1'). And where private key 1' is generated, step 242' may include the private key 1' being sent directly from the call center 20 to the telematics unit 30. And step 240 provides private key 1' as well to the mobile device 96.

In other embodiments, the secret key data which may include the telematics unit unique identifier(s) and the mobile device unique identifier(s) may be provided to the call center 20 in various ways. In FIGS. 2 and 3, the illustrated steps [206-212] are identical—each step pertains at least in part to providing the secret key data to the call center. However other embodiments exist; e.g., the telematics unit may directly send its unique identifier(s) to the call center independent of the mobile device sending its unique identifier(s). Or the telematics unit may request one or more unique identifiers from the mobile device, and upon receipt, the telematics unit may send its unique identifier(s) and the mobile devices unique identifier(s) to the call center. In addition, other implementations pertaining to the unique identifiers of the mobile device and telematics unit exist—e.g., in some instances, as will be momentarily explained, the telematics unit does not provide one or more unique identifiers.

Figure 4:
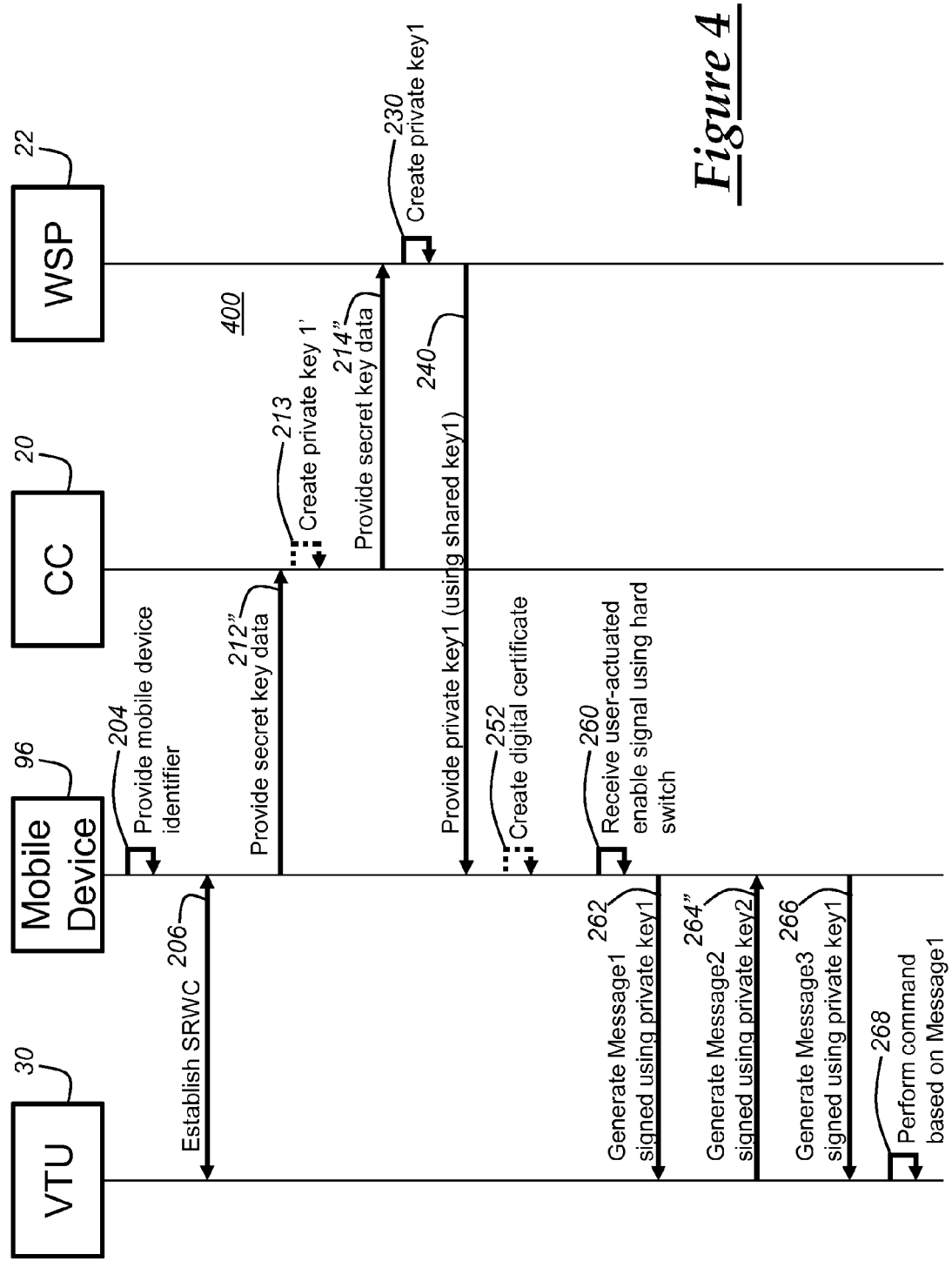
FIG. 4 is a flow diagram depicting yet another exemplary embodiment.

In another embodiment (method 400), the telematics unit does not provide a unique identifier to the mobile device 96 or the call center 20 or the WSP 22. As shown in FIG. 4, steps 202, 208, 210, 232, and 242 are eliminated since the telematics unit does not receive the second key pair (which is based on the telematics unit identifier). Also, steps 212, 214, and 264 are changed—the remaining steps are not different. In steps 212" and 214", only the one or more mobile device unique identifiers are transmitted (i.e., in step 212", the one or more mobile device unique identifiers are sent from the mobile device to the call center, and in step 214", the one or more mobile device unique identifiers are sent from the call center to the WSP). Lastly, in step 264", the telematics unit still generates the challenge or second message, however, the message is not signed using the second private key. In this way, the mobile device 96 is still provided the first private key and still enables the telematics unit to validate the response to the nonce challenge using the first public key; however, transmissions from the telematics unit to the mobile device conveying the challenge message may be less secure.

Other implementations may also exist. For example in FIG. 4, steps 262 and 264" may be eliminated. In this embodiment, the telematics unit 30 may initiate the vehicle function without the transmission of the second or third messages; i.e., the telematics unit may initiate the performance of the function provided it receives the first message signed using the mobile device's first private key. And in another implementation, FIG. 4 may include optional steps 213 and 252 (optional step 250 being omitted since the telematics is not provided a private key). When optional step 213 is completed, the secret key data sent to the WSP 22 may be the private key 1'—which, in this instance, may include only data associated with the mobile phone 96 (rather than the device 96 and the telematics unit 30). And when optional step 252 is completed, the steps 262 and 266 may utilize the digital certificate generated using the private key 1' and the random data.

Figure 5:
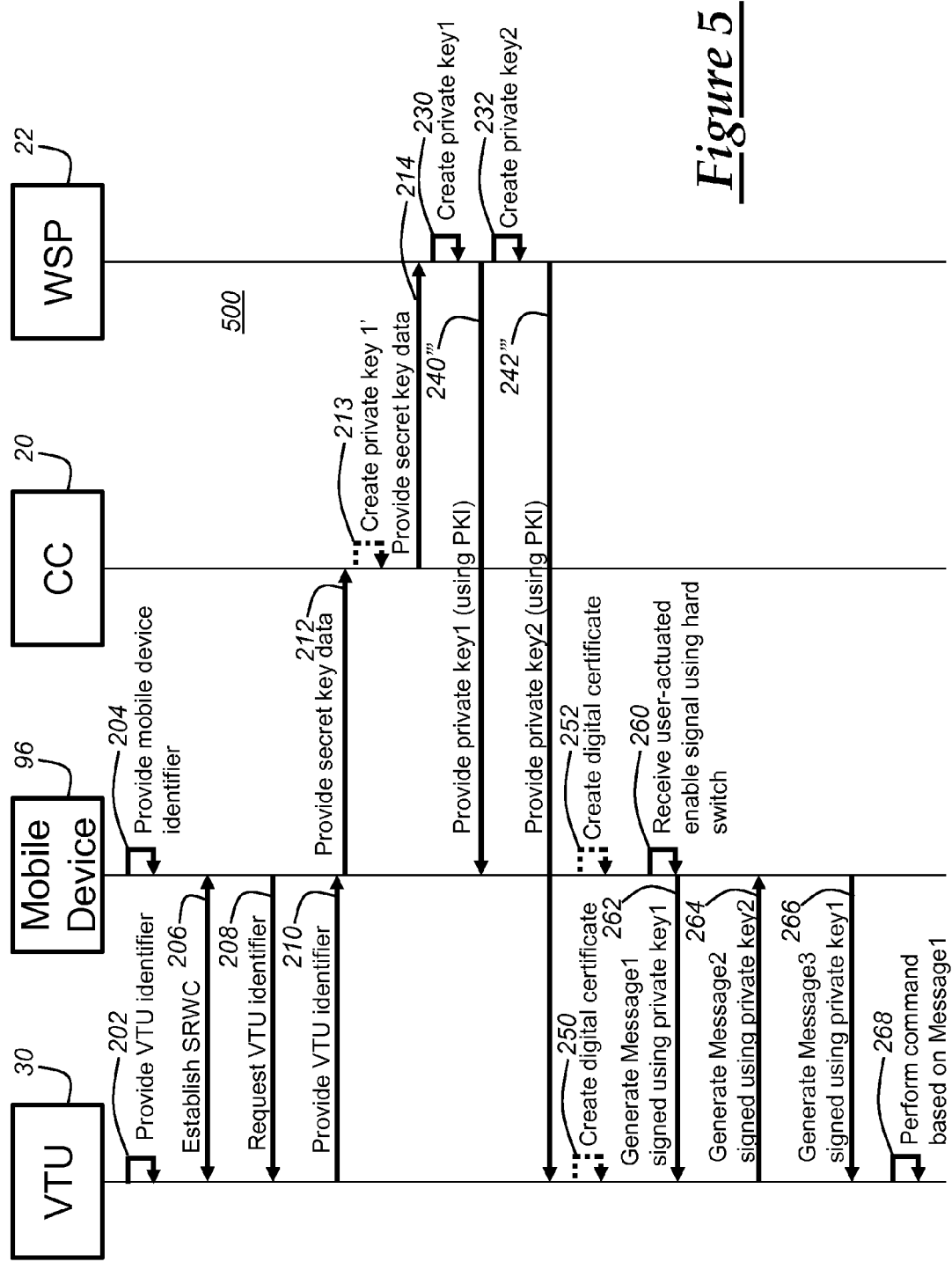
FIG. 5 is a flow diagram depicting yet another exemplary embodiment.

In another embodiment (method 500) shown in FIG. 5, private key infrastructure may not be used to communicate the first and/or second private keys between the WSP 22 and the mobile device 96; e.g., the WSP 22 and mobile device 96 may not use shared or symmetric keys (at least for this purpose). Steps 240 and 242 differ and are designated as 240''' and 242'''—otherwise, all other steps may be identical to those shown in FIG. 2 and therefore will not re-discussed here. Here, the mobile device may keep a third private key secret and the WSP may have a third public key associated with the third private key according to a public key infrastructure (PKI). Thus, the WSP may sign the communication [step 240'''] containing the first private key using the third public key. In this way, as will be appreciated by skilled artisans, only the holder or keeper of the third private key (e.g., the mobile device) may read and/or understand the communication [step 240'''] containing the first private key. Similarly, private key infrastructure may or may not exist between the WSP 22 and the telematics unit 30; e.g., the telematics unit and the WSP may use PKI. For example, the telematics unit may be the keeper of a fourth private key and the WSP may have an associated fourth public key and may sign the communication containing the second private key with the fourth public key. Therefore, only the holder of the fourth private key (e.g., the telematics unit) may read and/or understand the communication [step 242'''] containing the second private key.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of establishing a secure communication channel between a vehicle and a mobile device, comprising the steps of:
   providing to a call center a unique mobile device identifier and a unique vehicle telematics unit (VTU) identifier;
   receiving at the mobile device a first private key that is associated at least in part with the unique mobile identifier and that is associated at least in part with the unique VTU identifier, wherein the first private key is generated at a wireless service provider (WSP) and received by the mobile device within a first cryptographic envelope signed with a first cryptographic key by the WSP; and
   establishing a secure communication channel between the VTU and mobile device, wherein the mobile device transmits message(s) to the VTU signed with the first private key and the mobile device receives message(s) from the VTU which are signed with a second private key, wherein the second private key is associated at least in part with the unique mobile identifier and at least in part with the unique VTU identifier, wherein the VTU received the second private key from the call center or the WSP within a second cryptographic envelope signed with a second cryptographic key, wherein the second cryptographic envelope is different than the first cryptographic envelope.

2. The method of claim 1 wherein the mobile device provides to the call center the unique mobile device identifier and the unique VTU identifier.

3. The method of claim 2 wherein the mobile device receives the VTU identifier from the VTU using short range wireless communication (SRWC).

4. The method of claim 1 wherein the unique mobile device identifier includes a first international mobile subscriber identity (IMSI), wherein the unique VTU identifier includes a second IMSI.

5. The method of claim 1 wherein the call center provides the unique mobile identifier to the WSP which in turn generates the first private key, wherein the second private key is generated at the call center or the WSP, wherein, when the WSP generates the second private key, the call center provides the unique VTU identifier to the WSP.

6. The method of claim 1 wherein the first and second private keys are identical according to a shared key infrastructure or are different according to a public key infrastructure (PKI).

7. The method of claim 1 wherein the first and second cryptographic keys are based on one of a private key infrastructure or a public key infrastructure.

8. A method of receiving a secure communication at a vehicle from a mobile device, comprising the steps of:
   establishing short range wireless communication (SRWC) between a mobile device and a vehicle telematics unit (VTU);
   receiving at the VTU at least one communication via SRWC from the mobile device, wherein the at least one communication is digitally signed using a first private key, wherein the first private key is associated at least in part with a unique identifier associated with a first subscriber identity module (SIM) within the mobile device, wherein the at least one communication includes a first public key associated with the first private key; and
   decrypting the at least one communication at the VTU using the first public key, wherein the first private key was received by the mobile device previous to the receiving step in a first cryptographic envelope signed by a wireless service provider (WSP) using a first cryptographic key and transmitted from the WSP to the mobile device via cellular transmission, wherein the WSP provides cellular services using infrastructure associated with a wireless carrier system.

9. The method of claim 8 wherein the at least one communication is a command to perform at least one vehicle function, wherein the at least one vehicle function includes one of unlocking a vehicle door or starting the vehicle's engine.

10. The method of claim 8 wherein the first cryptographic key is based on private key infrastructure between the WSP and the mobile device that existed prior to generating the first private key.

11. The method of claim 8 wherein the at least one communication received at the VTU is enabled by a user actuation of a hard switch on the mobile device at the time of the at least one communication.

12. The method of claim 11 wherein the switch actuation enables a transmission antenna on the mobile device or enables the first SIM in the mobile device to an operative state.

13. A method of receiving a secure communication at a vehicle from a mobile device, comprising the steps of:
   establishing short range wireless communication (SRWC) between a mobile device and a vehicle telematics unit (VTU);
   receiving at the VTU at least one communication from the mobile device, wherein the at least one communication is digitally signed using a first private key, wherein the first private key is associated at least in part with a unique identifier associated with a first subscriber identity module (SIM) within the mobile device, wherein the at least one communication includes a first public key associated with the first private key;
   decrypting the at least one communication at the VTU using the first public key, wherein the first private key was received by the mobile device previous to the receiving step in a first cryptographic envelope signed with a first cryptographic key from a wireless service provider (WSP); and
   validating the at least one communication by sending a challenge message from the VTU to the mobile device via SRWC, wherein the challenge message is digitally signed using a second private key, wherein the second private key was received by the VTU previous to the receiving step in a second cryptographic envelope signed with a second cryptographic key, wherein the challenge message includes a challenge query and a second public key associated with the second private key whereby the mobile device may decipher the challenge message.

14. The method of claim 13 wherein the second cryptographic envelope is associated with a private key infrastructure between either the VTU and the call center or the VTU and the WSP that existed prior to generating the second private key.

15. The method of claim 13 wherein the challenge query includes a nonce challenge.

16. The method of claim 13 further comprising receiving a response message from the mobile device in response to the challenge query, wherein the response message is signed using the first private key.

17. The method of claim 16 wherein the at least one communication received at the VTU from the mobile device has a first time stamp, the challenge message has a second time stamp, and the response message has a third time stamp, wherein the validating step further comprises the duration of time between any two of time stamps is less than or equal to a predetermined value.

18. The method of claim 13 wherein the second private key is associated at least in part with a unique identifier associated with a first subscriber identity module (SIM) having a computer processing unit (CPU) within the VTU, wherein the digital signature is based on the second private key and random data accessible to the SIM CPU.

19. The method of claim 18 wherein second private key accessible only to the SIM CPU.

20. A method of secure communication between a vehicle and a mobile device, comprising the steps of:

(a) establishing short range wireless communication (SRWC) between a mobile device and a vehicle telematics unit (VTU);
(b) receiving at the VTU a command communication to perform a vehicle function via SRWC from the mobile device, wherein the command communication is digitally signed using a first private key associated with a unique identifier of the mobile device, wherein the first private key was transmitted to the mobile device from a wireless service provider (WSP) previous to step (a) in a first cryptographic envelope signed by the WSP;
(c) decrypting the command communication at the VTU;
(d) in response to step (c), generating a challenge communication at the VTU using a second private key, wherein the second private key is associated with a unique identifier of the VTU, wherein the second private key was received by the VTU from the WSP previous to step (a) in a second cryptographic envelope signed by the WSP;
(e) providing the challenge communication from the VTU to the mobile device via SRWC;
(f) receiving at the VTU an accurate response communication from the mobile device via SRWC, wherein the response communication is associated with the mobile device receiving the challenge communication; and
(g) based on the accuracy of the response communication, executing the command communication to perform the vehicle function.

* * * * *